United States Patent
Chang et al.

(10) Patent No.: US 7,467,521 B2
(45) Date of Patent: Dec. 23, 2008

(54) METHOD FOR CONTROLLING MULTI-TYPE AIR CONDITIONER

(75) Inventors: Se Dong Chang, Gwangmyeong-si (KR); Yoon Been Lee, Seoul (KR); Jae Heuk Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 11/249,708

(22) Filed: Oct. 14, 2005

(65) Prior Publication Data

US 2006/0123803 A1    Jun. 15, 2006

(30) Foreign Application Priority Data

Dec. 9, 2004    (KR) .................. 10-2004-0103552

(51) Int. Cl.
*F25B 43/02*    (2006.01)
*F25B 31/00*    (2006.01)
*F25B 41/04*    (2006.01)

(52) U.S. Cl. ................. 62/84; 62/192; 62/216; 62/468

(58) Field of Classification Search .............. 62/84, 62/157, 192, 199, 216, 231, 468
See application file for complete search history.

(56) References Cited

U.S. PATENT DOCUMENTS 4,932,215 A * 6/1990 Kanazawa et al. ............. 62/84

FOREIGN PATENT DOCUMENTS

| EP | 0 848 214 A2 | | 6/1998 |
| JP | 5-256532 A | | 10/1993 |
| JP | 2001133017 A | * | 5/2001 |
| JP | 2002-349938 A | | 12/2002 |
| JP | 2004-116805 A | | 4/2004 |

* cited by examiner

*Primary Examiner*—Chen-Wen Jiang
(74) *Attorney, Agent, or Firm*—Birch, Stewart, Kolasch & Birch, LLP

(57) ABSTRACT

The present invention relates to a method for controlling an air conditioner, in which operation time periods of an outdoor unit is integrated, to determined a time point when an oil recovery operation is performed, and performing the oil recovery operation only when a summed rates, or a number of indoor units accessed with communication is higher than a value preset at a control unit.

14 Claims, 3 Drawing Sheets

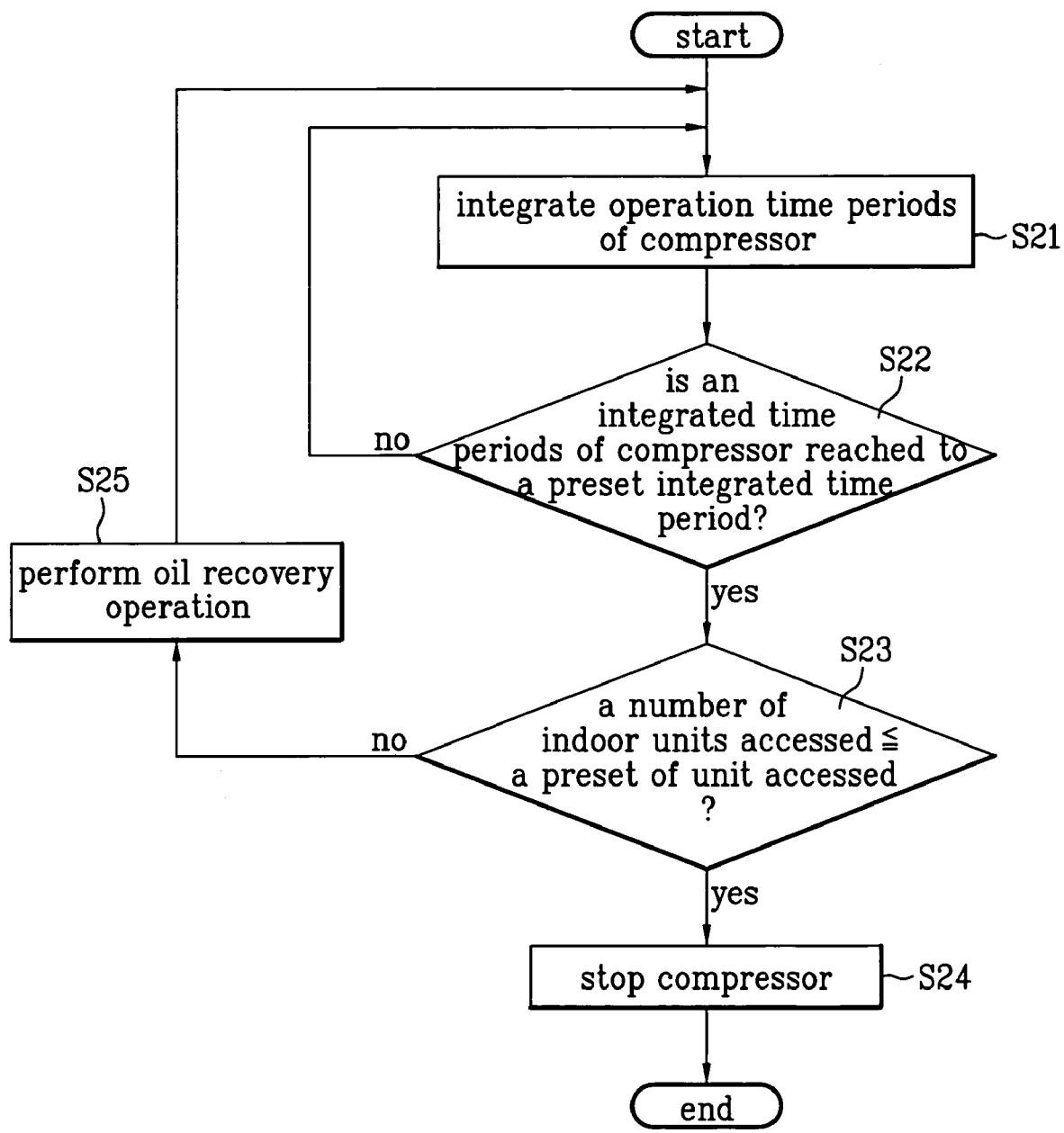

METHOD FOR CONTROLLING MULTI-TYPE AIR CONDITIONER

CROSS-REFERENCE TO RELATED APPLICATION

This application claims the benefit of Korean Application No. P2004-103552, filed on Dec. 9, 2004, which is hereby incorporated by reference as if fully set forth herein.

BACKGROUND OF THE INVENTION

1. Field of the Invention

The present invention relates to multi-type air conditioners, and more particularly, to a method for controlling a multi-type air conditioner for preventing damage to a compressor.

2. Discussion of the Related Art

In general, the air conditioner cools or/and heats rooms as the air conditioner performs steps of compression, condensing, expansion, and evaporation of refrigerant. In air conditioning systems, there are cooling air conditioner for supplying cold air to the room by operating a refrigerating cycle only in one direction, and cooling/heating air conditioner for supplying cold or warm air to the room by operating the refrigerating cycle in either direction, selectively. Moreover, there are general air conditioners in which one indoor unit is connected to one outdoor unit, and multi-type air conditioners in which a plurality of indoor units are connected to one outdoor unit. In the meantime, the multi-type air conditioner may have one of more than one outdoor unit.

The multi-type air conditioner integrates operating time periods, and determines if the integrated time period reaches to an integrated time period preset at a control unit. If it is determined that the integrated time period reached to the integrated time period, an oil recovery operation is performed in which an expansion device in the indoor unit is opened, and the compressor is driven at the highest rotation frequency, for recovering oil accumulated in the indoor unit.

In the meantime, the multi-type air conditioner employs an individual power source system in which a plug for an indoor unit is plugged in/out at the room, individually. The air conditioner of such an individual power source system can be turned off as a user plugs-out.

However, the air conditioner of the individual power source system has the following problems.

First, if most of the users plugged-out the indoor units, even if the outdoor unit tries to access to the indoor units with communication, only to fail. In this instance, because the control unit of the outdoor unit can not open the expansion devices of the indoor units access to which have failed, after opening the expansion devices of the indoor units access to which were successive fully, the oil recovery operation is performed. Therefore, since refrigerant can not be recovered from the indoor units access to which have failed, while recovering the refrigerant from the indoor units access to which were successive merely, a refrigerant recovery ratio can not but become poor, substantially.

Second, since the compressor rotates at a high speed at the time of the refrigerant recovery operation, the more a number of the indoor units access to which have failed, a rate of oil discharged from the compressor becomes relatively greater than a rate of oil recovered to the compressor. Therefore, in a state a number of indoor units access to which have failed is greater than a number of units access to which were successive, the more the refrigerant recovery operation is made, the more amount of oil is reduced from the compressor, gradually.

Third, as above, there are cases when an adequate amount of oil for operating the compressor can not be recovered even if the refrigerant recovery operation is made thus, when the compressor is liable to damage if the compressor is kept operated in such a state.

Fourth, since the compressor is operative even in a state of oil shortage, the related art multi-type air conditioner can not know the damage to the compressor in advance, or deal with the damage to the compressor with flexibility.

SUMMARY OF THE INVENTION

Accordingly, the present invention is directed to a method for controlling a multi-type air conditioner that substantially obviates one or more problems due to limitations and disadvantages of the related art.

An object of the present invention is to provide a method for controlling a multi-type air conditioner for preventing damage to a compressor, and dealing with damage to the compressor with flexibility.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a multi-type air conditioner includes the step of a control unit integrating operation time periods of an outdoor unit, the control unit attempting to access to all indoor units with communication if it is determined that the integrated time period of the outdoor unit reaches to an integrated time period preset at the control unit, summing maximum operation rates of the indoor units accessed with the communication, determining whether the summed operation rate is higher than a rate preset at the control unit, and performing an oil recovery operation of the indoor units only when the summed rate is higher than the preset rate.

Preferably, the method further includes the step of turning off the outdoor unit if the summed rate is lower than the preset rate, and informing to an outside that it is lower than a number of indoor units accessed.

Preferably, the preset rate is 20~30% of a total operation rate which is a sum of maximum rates of all indoor units.

In another aspect of the present invention, a method for controlling a multi-type air conditioner includes the step of a control unit integrating operation time periods of an outdoor unit, the control unit attempting to access to all indoor units with communication if it is determined that the integrated time period of the outdoor unit reaches to an integrated time period preset at the control unit, determining a number of indoor units accessed of all of indoor units, and performing an oil recovery operation of the indoor units only when the number of indoor units accessed is greater than a preset number of indoor units accessed.

Preferably, the method further includes the step of turning off the outdoor units if the number of the indoor units accessed is smaller than the preset number of indoor unit accessed, and informing to an outside that it is smaller than a number of indoor units accessed if the number of the indoor units accessed is smaller than the preset number of the indoor units accessed.

Preferably, the preset number of the indoor units accessed is 20~30% of a total number of the indoor units accessed.

In another aspect of the present invention, a method for controlling a multi-type air conditioner includes the step of a control unit of an outdoor unit integrating operation time periods of an outdoor unit, the control unit attempting to access to all indoor units with communication if it is determined that the integrated time period of the outdoor unit reaches to an integrated time period preset at the control unit, summing operation rates of the indoor units accessed with communication, or determining a number of indoor units accessed with communication, and informing to an outside that an oil recovery operation is not possible, if a summed operation rate of the indoor units, or the number of indoor units accessed is lower than a rate, or a number of units accessed preset at the control unit.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 3 illustrates a flow chart showing the steps of a method for controlling the multi-type air conditioner in FIG. 1 in accordance with a second preferred embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A multi-type air conditioner in accordance with a preferred embodiment of the present invention will be described with reference to FIG. 1.

Figure 1:
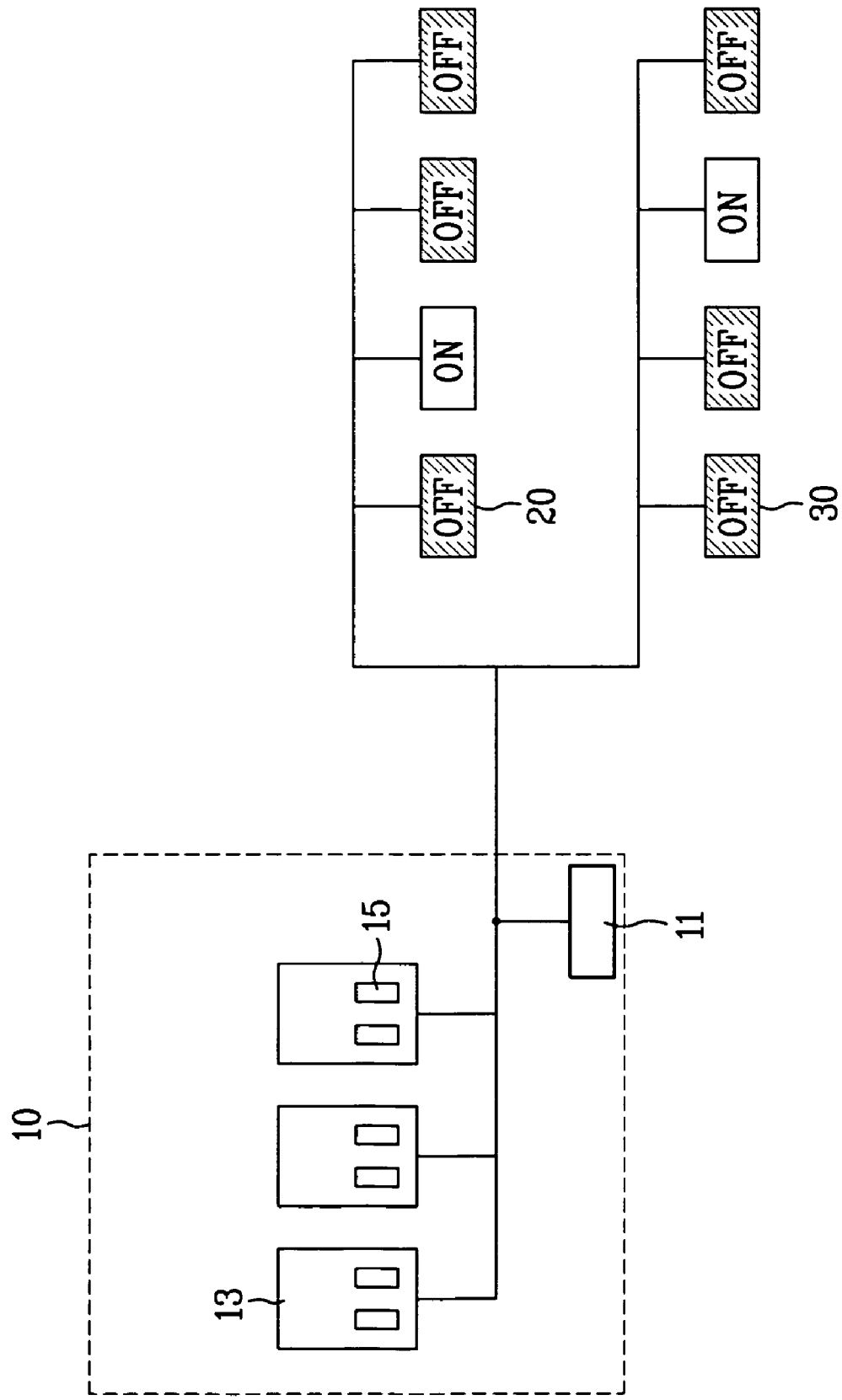
FIG. 1 illustrates a block diagram of a multi-type air conditioner in accordance with a preferred embodiment of the present invention.

Referring to FIG. 1, the multi-type air conditioner includes a plurality of indoor units 20 connected to an outdoor unit 10. The outdoor unit may include one or two outdoor set depending on capacity of a system. The outdoor set includes at least one compressor. In FIG. 1, reference numeral 13 denotes the outdoor set, and reference numeral 15 denotes the compressor.

If the outdoor unit includes one outdoor set 13, it is preferable that the outdoor set has at least two compressors 15 mounted thereto. In this instance, one of the compressors may be a single speed compressor of which operation frequency is unable to vary with operation capacity, and the other one of the compressors may be an inverter compressor of which operation rotating frequency can be varied with the operation capacity.

Even in a case the outdoor unit 10 includes two, or more than two outdoor sets 13, each of the outdoor set 13 has at least one compressor 15. In this instance, it is preferable the compressor in a main outdoor set is the inverter compressor, and the compressor in a sub-outdoor set and the other compressor in the main outdoor set are single speed compressors. Of course, it is apparent that every outdoor set has one inverter compressor.

The outdoor unit 10 includes a control unit 11 for controlling the outdoor sets 13 and the indoor units 20, and 30. The control unit 11 is connected to the indoor units 20, and 30 with communication lines.

The indoor units 20, and 30 are connected to the outdoor unit 10 with individual power sources, entirely, or partly. In FIG. 1, the individual power sources are omitted.

If a power plug is pulled out, the individual power sourced indoor unit can not be accessed from the outdoor unit through communication. The individual power sourced indoor units 20, and 30 having the power plug pulled out thus are mounted such that the expansion devices thereof can not be opened/closed by the control unit 11.

Figure 2:
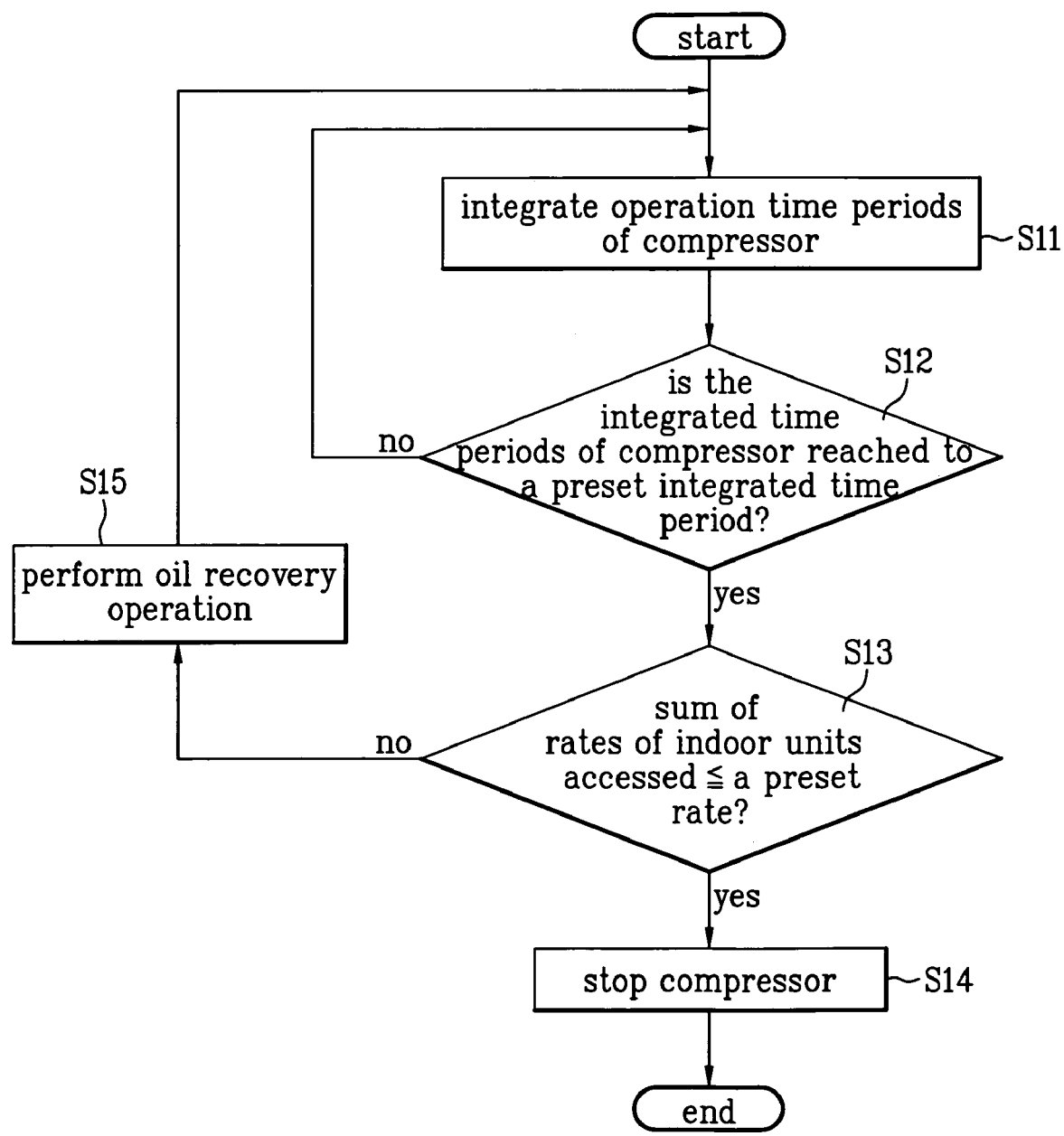
FIG. 2 illustrates a flow chart showing the steps of a method for controlling the multi-type air conditioner in FIG. 1 in accordance with a first preferred embodiment of the present invention.

A method for controlling the multi-type air conditioner in accordance with a first preferred embodiment of the present invention will be described with reference to FIG. 2.

Upon putting the outdoor unit into operation, the control unit integrates operation time periods of the outdoor unit (S11). It is preferable that the operation time periods of the compressor are integrated. This is for starting an oil recovery operation with reference to the operation time period of the compressor because the longer the operation time period of the compressor, the greater the amount of oil accumulated in the indoor unit.

It is determined whether the integrated time period of the compressor reaches to an integrated time period preset at the control unit or not (S12). If it is determined that the integrated time period of the compressor reaches to an integrated time period preset at the control unit, the control unit tries to access to all indoor units with communication.

Then, of all indoor units, it is preferable that maximum operating rates of the indoor units access to which are made with communication are summed. This is because a maximum rate of refrigerant is introduced to the accessed indoor units as the operation frequency of the compressor is increased in a state the expansion device is opened fully in the oil recovery operation.

Then, the summed rate of the accessed indoor units is compared to the rate preset at the control unit (S13). If it is determined that the summed rate of the accessed indoor units is lower than the rate preset at the control unit, operation of the compressor is stopped (S14). Or, if it is determined that the summed rate of the accessed indoor units is higher than the rate preset at the control unit, the oil recovery operation is performed (S15).

In this instance, it is preferable that the rate preset at the control unit is set within a range of 20~30% of a total operating rate of the indoor units. It is required that above figure is varied with the total rate of the system, appropriately. For an example, it is preferable that, if the total rate of the system is low, the total operating rate of the indoor units is set close to 30%, and if the total rate of the system is high, the total operating rate of the indoor units is set close to 20%. This is because the more the total system oil amount, the greater the total oil amount of the compressors.

Once the oil recovery operation is started, the compressors are operated at a maximum operating frequency, and all expansion valves of the accessed indoor units are opened fully. In this instance, refrigerant flow speed and rate of the system increase significantly, refrigerant accumulated in the accessed indoor units is recovered to the compressors through refrigerant pipes.

The first embodiment method can increase an oil recovery efficiency to prevent damage to the compressors in advance even if the first embodiment method is applied to the multi-type air conditioner having the indoor units with different capacities. Of course, the first embodiment method is applicable to the multi-type air conditioner having the indoor units with the same capacities.

A method for controlling the multi-type air conditioner in accordance with a second preferred embodiment of the present invention will be described, with reference to FIG. 3.

Upon putting the outdoor unit into operation, the control unit of the outdoor unit integrates operation time periods of the outdoor unit (S21). For an example, the operation time periods of the compressor are integrated.

It is determined whether the integrated time period of the compressor reaches to an integrated time period preset at the control unit or not (S22). If it is determined that the integrated time period of the compressor reaches to the integrated time period preset at the control unit, the control unit tries to access to all indoor units by means of communication. Then, of all the indoor units, a number of the indoor units access to which is made by means of communication are determined.

Then, the number of the indoor units access to which is made is compared to a number of the indoor units preset at the control unit access to which is made (S23). If it is determined that the number of the indoor units access to which is made is lower than the number of the indoor units preset at the control unit, no oil recovery operation is performed. (S24). Or, if it is determined that the number of the indoor units access to which is made is greater than the number of the indoor units preset at the control unit, the oil recovery operation is performed (S25).

In this instance, it is preferable that the number of the indoor units preset at the control unit is set within a range of 20~30% of a total number of the indoor units access to which is made. It is required that above figure is varied with a total number of the indoor units in the system, appropriately. For an example, it is preferable that, if the total number of the system is small, the total number of the indoor units access to which is made is set close to 30%, and if the total number of the indoor units in the system is great, the total number of the indoor units access to which is made is set close to 20%.

Once the oil recovery operation is started, the compressors are operated at a maximum operating frequency, and all expansion valves of the accessed indoor units are opened fully. In this instance, since refrigerant flow speed and rate of the system increase significantly, refrigerant accumulated in the accessed indoor units is recovered to the compressors.

The second embodiment method is applicable to a case the indoor units have the same capacities. This is because the sum of refrigerant rates is available even if only a number of the indoor units under operation are taken into account. Of course, the second embodiment method is applicable even if the capacities of the indoor units have slight difference.

The advantages of the method for controlling a multi-type air conditioner of the present invention will be described.

First, because the compressor is stopped without making no more oil recovery operation if the summed rate, or a number of the indoor units accessed with communication is small, the damage to the compressor caused by operation of the compressor in a state the compressor has shortage of oil can be prevented. Moreover, as the oil recovery operation is performed, drainage of oil can be prevented.

Second, the determination of performance of the oil recovery operation in advance with reference to the summed rate, or a number of the indoor units accessed permits to prevent damage to the compressor in advance.

Third, the error display to an outside of the air conditioner when the summed rate, or a number of the indoor units accessed is not adequate permits the users to notice damage to the compressor in advance, and deal with it with flexibility.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a multi-type air conditioner comprising the step of:
   a control unit integrating operation time periods of an outdoor unit;
   the control unit attempting to access to all indoor units with communication if it is determined that the integrated time period of the outdoor unit reaches to an integrated time period preset at the control unit;
   summing maximum operation rates of the indoor units accessed with the communication;
   determining whether the summed operation rate is higher than a rate preset at the control unit; and
   performing an oil recovery operation of the indoor units only when the summed rate is higher than the preset rate.

2. The method as claimed in claim 1, further comprising the step of turning off the outdoor unit if the summed rate is lower than the preset rate.

3. The method as claimed in claim 1, wherein the preset rate is 20~30% of a total operation rate which is a sum of maximum rates of all indoor units.

4. The method as claimed in claim 1, further comprising the step of informing to an outside that it is lower than a number of indoor units accessed if the summed rate is lower than the preset rate.

5. The method as claimed in claim 1, wherein the control unit can not control the indoor units if individual power sources to the indoor units are turned off.

6. The method as claimed in claim 1, wherein the oil recovery operation is performed in a state expansion valves of the accessed indoor units are opened fully.

7. A method for controlling a multi-type air conditioner comprising the step of:
   a control unit integrating operation time periods of an outdoor unit;
   the control unit attempting to access to all indoor units with communication if it is determined that the integrated time period of the outdoor unit reaches to an integrated time period preset at the control unit;
   determining a number of indoor units accessed of all of indoor units; and
   performing an oil recovery operation of the indoor units only when the number of indoor units accessed is greater than a preset number of indoor units accessed.

8. The method as claimed in claim 7, further comprising the step of turning off the outdoor units if the number of the indoor units accessed is smaller than the preset number of indoor unit accessed.

9. The method as claimed in claim 7, wherein the preset number of the indoor units accessed is 20~30% of a total number of the indoor units accessed.

10. The method as claimed in claim 7, further comprising the step of informing to an outside that it is smaller than a number of indoor units accessed if the number of the indoor units accessed is smaller than the preset number of the indoor units accessed.

11. The method as claimed in claim 7, wherein the control unit can not control the indoor units if individual power sources to the indoor units are turned off.

12. The method as claimed in claim 7, wherein the oil recovery operation is performed in a state expansion valves of the accessed indoor units are opened fully.

13. A method for controlling a multi-type air conditioner comprising the step of:

a control unit of an outdoor unit integrating operation time periods of an outdoor unit;

the control unit attempting to access to all indoor units with communication if it is determined that the integrated time period of the outdoor unit reaches to an integrated time period preset at the control unit;

summing operation rates of the indoor units accessed with communication, or determining a number of indoor units accessed with communication; and informing to an outside that an oil recovery operation is not possible, if a summed operation rate of the indoor units, or the number of indoor units accessed is lower than a rate, or a number of units accessed preset at the control unit.

14. The method as claimed in claim 13, wherein the outdoor unit is turned off if it is informed that the oil recovery operation is not possible.

* * * * *